F. KÜHTZ.
MACHINE FOR DIVIDING AND FORMING DOUGH OR OTHER PLASTIC MATERIAL.
APPLICATION FILED JULY 26, 1911.

1,101,857.

Patented June 30, 1914.
2 SHEETS—SHEET 1.

Witnesses.

Inventor.

F. KÜHTZ.
MACHINE FOR DIVIDING AND FORMING DOUGH OR OTHER PLASTIC MATERIAL.
APPLICATION FILED JULY 26, 1911.

1,101,857.

Patented June 30, 1914.

2 SHEETS—SHEET 2.

Witnesses.

Inventor.
Friedrich Kühtz.

UNITED STATES PATENT OFFICE.

FRIEDRICH KÜHTZ, OF CANNSTATT-STUTTGART, GERMANY.

MACHINE FOR DIVIDING AND FORMING DOUGH OR OTHER PLASTIC MATERIAL.

1,101,857. Specification of Letters Patent. Patented June 30, 1914.

Application filed July 26, 1911. Serial No. 640,596.

*To all whom it may concern:*

Be it known that I, FRIEDRICH KÜHTZ, a subject of the King of Prussia, and resident of Cannstatt-Stuttgart, Germany, have invented certain Improvements in Machines for Dividing and Forming Dough or other Plastic Material, and do hereby declare the following is a full, clear, and exact description of the same.

The object of this invention is to provide apparatus for dividing up doughlike substances into portions of predetermined size and in which the substance is pressed by a feeding screw alternately into two cylinders formed in a rotary body, the stroke of the cylinder pistons being made adjustable so as to deliver portions of dough or the like of desired size or weight. The arrangement is such that while one cylinder is being filled the other is being emptied of its contents, so that the output of the engine may be as high as possible.

Figure 1:
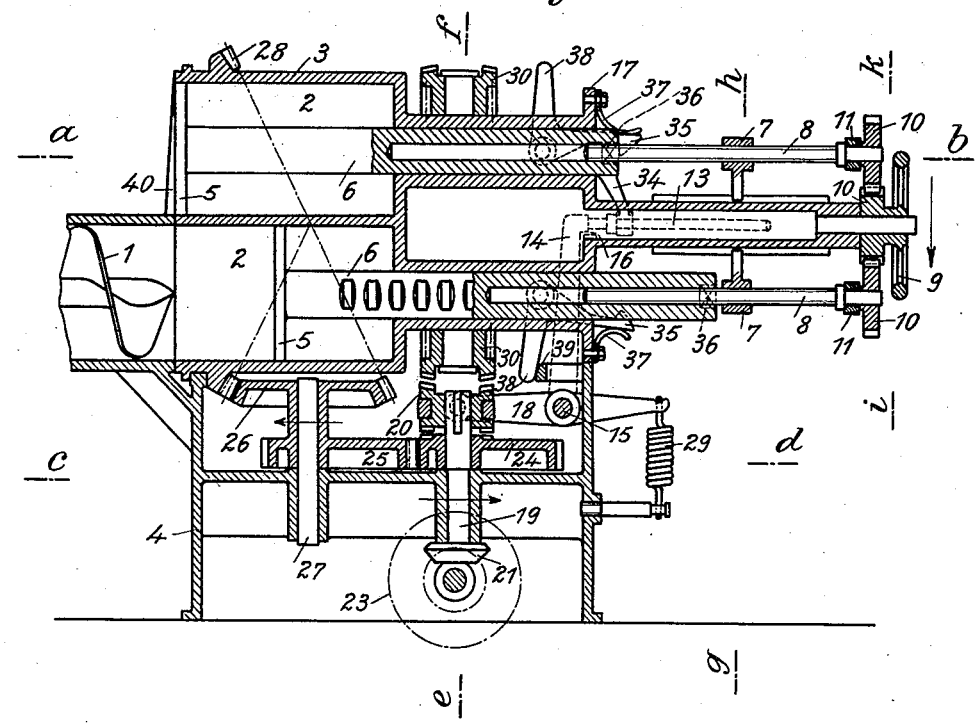
Figure 2:
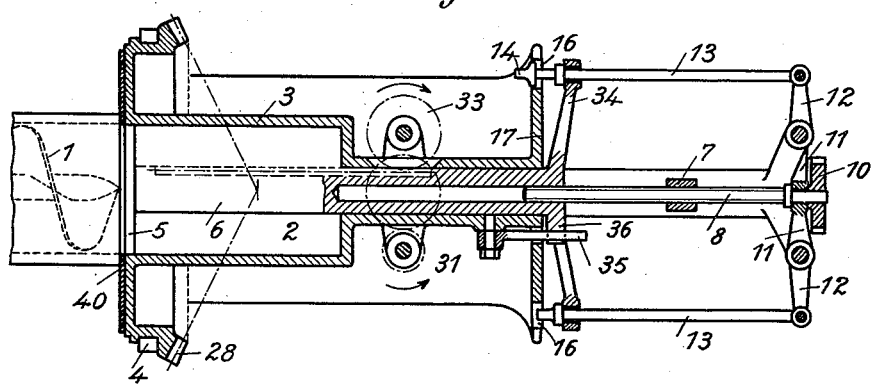
Figure 4:
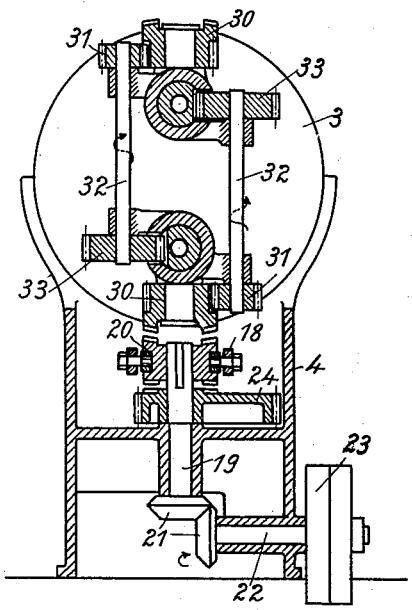
Figure 5:
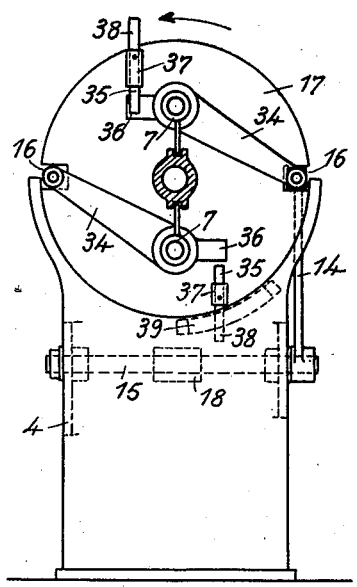
Figure 3:
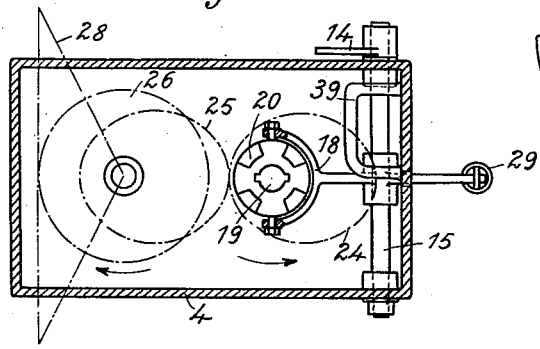
Figure 6:
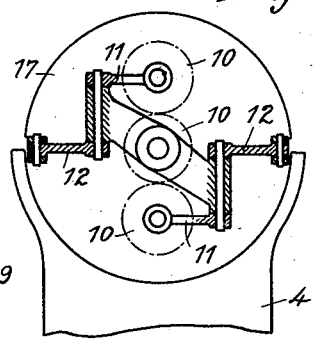

The invention will be described with reference to a machine having two cylinders and illustrated in the accompanying drawings, in which, Figure 1 is a vertical section along the axis of the machine; Fig. 2 is a horizontal section on the line *a—b* in Fig. 1; Fig. 3 is a horizontal section on line *c—d* in Fig. 1; Fig. 4 is a vertical section on the line *e—f* in Fig. 1; Fig. 5 is a vertical section on the line *g—h* in Fig. 1; and Fig. 6 is a sectional elevation on the line *i—k* in Fig. 1.

The dough or other substance is pressed by a conveyer or feeding screw 1 into the lower of the two cylinders 2, which together constitute a rotary body 3 supported in bearings on the support or frame 4. The dough as it is fed into a cylinder presses the corresponding piston 5 and piston rod 6 forward till the end of the rod engages the screw nut 7. These nuts each have an arm engaging a suitably formed part of the frame which prevents them from turning, but they may be simultaneously turned, by means of the hand wheel 9 and toothed wheel 10 and accordingly adjusted along the threaded spindles 8 according to the weight or size of dough desired.

One end of each spindle 8 rotates in the levers 11, the other ends slide freely in cavities in the piston rods 6, the levers 11 are pivotally connected with the levers 12 and the latter are pivotally joined with the levers 13. Pressure of a piston rod 6 against the corresponding nut 7 causes the rod 13 connected with said nut, to push against a lever 14, fixed on the shaft 15 with its free end projecting through one of a pair of apertures 16, formed in the disk 17 which forms part of the body 3. A forked lever 18 is also fixed on the shaft 15 and supports the clutch coupling 20 sliding on the shaft 19. The shaft 19 may be driven by the bevel gearing 21 controlled by the fast and loose pulleys 23. A wheel 24 provided with clutches is mounted eccentrically and loosely on the shaft 19 and is placed under the clutch coupling 20. The toothed eccentric wheel 24 is of elliptical form and drives a similar wheel 25 which is integral with or fixed to the bevel gear 26 on shaft 27; the wheel 26 meshes with the toothed rim 28 of the rotary body 3, the ratio of gearing being 1:2.

When a rod 13 drives the lever 14 out of an aperture 16 the clutch coupling 20 is thrown into gear with the wheel 24 by means of the lever 18 and the rotary body 3 is set in motion by means of the gearing 24, 25, 26 and 28. The nose of the lever 14 will slide on the face of the rotating disk 17 and thus keep the clutch coupling in gear with wheel 24 for half a rotation. The lever 14 will, after a half rotation of the disk 17, fall into the other aperture 16 under the influence of spring 29, which has its two ends fixed to lever 18 and to the frame 4. As lever 14 falls into the latter aperture or notch the lever 18 will draw the clutch coupling out of engagement with the wheel 24 and the rotary body 3 will be held stationary. The eccentric wheels 24 and 25 are disposed in such a way that the rotary body is slowly put into motion when the clutches are thrown in, after which the speed first quickly increases, then decreases, and finally becomes slow again. The object of this arrangement is that shocks may be avoided and the time needed for turning the rotary body 3 reduced as much as possible. When the lever 14 engages one of the apertures 16 in the disk 17 and draws the coupling 20 out of gear with wheel 24, the coupling will, by action of the spring 29, be thrown into gear with the lower of two toothed wheels 30 which are mounted to turn about diametrically oppositely arranged studs on the body. Each toothed wheel 30 is in mesh with a second toothed wheel 31 on a shaft 32 and a toothed wheel 33 on the latter meshes with teeth 6′ formed on the piston rod 6. When either toothed wheel 30 is set in motion, the toothed wheel 33 geared thereto will drive the associated piston rod 6 and its piston 5 backward or into the chamber 2 until an arm 34 on the piston rod 6 engages a collar on the rod 13 and thereby rocks the levers 14, 18 into their middle position, wherein the clutch coupling rotates freely between the wheels 24 and 30. Detent levers 35, 38 pivoted on the frame are adapted to keep the clutch coupling in the middle position and the higher of the two piston rods in the extreme rear position. The detent portions 35 of the levers are adapted to slide over the heads 36 of the piston rods and retain them alternately in the desired position, by means of the pressure of springs 37. When the arms 38 of the detent levers 35, 38 by reason of the rotation of the disk portion 17 are brought alternately into engagement with a cam member 39 fixed on frame 4, the detent portion 35 is moved out of engagement with the end of the piston rod which is thereupon free to be pushed forward under pressure of the dough being fed in.

The machine works automatically as follows:—Supposing the nuts 7 have been adjusted compatible with desired quantities or weights of dough to be portioned off, power is applied and the feeding screw then presses the dough against the piston 5 which for the time being is lowermost and which is thus moved forward in its cylinder 2; as soon as this cylinder is filled with the predetermined weight of dough the rotary body 3 is, as explained above, turned and the cylinder that was in the lower position rises to the upper position, and its piston 5 is driven back and at the same time forces out the dough from inside the cylinder and the expelled dough is separated from the remnant adjacent to the piston by a knife 40 during the next rotation of the rotary body 3. As the upper piston drives the dough out of the first cylinder, now in the upper position dough entering the other cylinder drives its piston forward and the process is repeated, a high efficiency being in this way obtained.

Two feeding screws may be employed instead of one, as shown, or any other suitable device for feeding the dough under pressure may be alternatively employed. Mechanisms of suitable known kind, automatically operating to interrupt the feed of the dough to the cylinders while the body 3 is rotating, may be adapted to the machine. In the machine represented in the drawings the dough is pushed in the lower cylinder and driven out of the upper one; this disposition may, however, be reversed, or the two cylinders may be mounted side by side. Three or more cylinders may be employed, provided the controlling mechanism be modified.

Having now particularly described and ascertained the nature of my said invention and in what manner the same is to be performed, I declare that what I claim is:—

1. In a machine for dividing plastic material into portions of predetermined size or weight, the combination of a rotary body containing a plurality of chambers, means for feeding material into one of said chambers, a piston within each of said chambers, power devices for rotating said body to bring the chambers therein successively into position to receive material from the feeding means, a rack connected with each piston, a plurality of trains of gearing carried by the rotary body and each engaging one of said racks, a clutch adapted to render either said rotating or piston reciprocating means operative, and means controlled by movement of the piston in the chamber being filled for successively shifting the clutch to actuate the rotating means, the reciprocating means and to render both said means inoperative.

2. In a machine for dividing plastic material into portions of predetermined size or weight, the combination of a rotary body provided with a plurality of chambers, means for feeding material into one of said chambers, an annular gear connected with said body, a power shaft, gearing connecting said power shaft with said annular gear and comprising two intermeshing eccentric gears whereby the body will be rotated to bring the several chambers thereof successively into position to receive material from the feeding means, means for expelling material from said chambers successively, and a clutch mechanism controlled by the material in the chamber being filled, for alternately connecting the shaft with and disconnecting it from said gearing for rotating the body.

3. In a machine for dividing plastic material into portions of predetermined size or weight, the combination of a rotary body containing a plurality of chambers, means for feeding material into one of said chambers, a piston within each chamber, two trains of gearing adapted, respectively, to rotate the body, to bring the chambers therein successively into position to receive material from the feeding means, and to move the piston in the filled chamber to eject the material therefrom, a driving shaft, a clutch gear adjustable to connect either of said trains of gearing to the driving shaft, and means controlled by the amount of material in the chamber being filled for moving said clutch to successively connect the two trains of gearing with the driving shaft and then from engagement with both said trains.

4. In a machine for dividing plastic material into portions of predetermined size or weight, the combination of a rotary body containing a plurality of chambers, means for feeding material into one of said chambers, a piston within each chamber, a rack connected with each piston, a pinion meshing with each rack, a driving shaft, gearing for rotating the body to bring the chambers therein successively into position to receive material from the feeding means, and means controlled by the amount of material in the chamber being filled for successively connecting the driving shaft with the body rotating gearing and the pinion engaging the rack connected with the piston in the filled chamber.

5. In a machine for dividing plastic material into portions of predetermined size or weight, the combination of a rotary body containing a plurality of chambers, means for feeding material into one of said chambers, a piston within each chamber, a rack connected with each piston, a pinion meshing with each rack, a continuously running driving shaft, gearing for rotating the body to bring the chambers therein successively into position to receive material from the feeding means, and means controlled by the amount of material in the chamber being filled for automatically connecting the driving shaft with the body rotating gearing, then disconnecting said gearing and shaft and connecting the pinion engaging the rack of the piston in the filled chamber with the driving shaft and finally disconnecting the shaft from both said pinion and gearing.

6. In a machine for dividing plastic material into portions of predetermined size or weight, the combination of a rotary body containing a plurality of chambers, means for feeding material into one of said chambers, a piston within each chamber, means controlled by the amount of material in the chamber being filled for rotating the body to bring another chamber into position to receive material from the feeding means and to move the piston in the filled chamber to force the material from said chamber, means for holding the last said piston at the limit of its material ejecting movement, and means for releasing said holding means as the chamber containing said piston comes into position to receive material from the feeding means.

7. In a machine for dividing plastic material into portions of predetermined size or weight, the combination of a rotary body containing a plurality of chambers, means for feeding material into one of said chambers, a piston in each chamber having its stem projecting rearwardly from the chamber and provided with a rack, pinions mounted on the body and each constantly engaging one of the racks, gearing adapted to rotate the body, a driving shaft, a clutch connected with said shaft and movable in opposite directions to, respectively, connect the shaft with said body rotating gearing and with one of the piston actuating pinions, a lever for shifting the clutch to connect the driving shaft to the body rotating gear, a spring for moving the clutch into engagement with the adjacent piston actuating pinion, means on the rotary body engaging the clutch lever to hold the clutch in an intermediate position, and means controlled by the amount of material in the chamber being filled for actuating the clutch lever.

8. In a machine for dividing plastic material into portions of predetermined size or weight, the combination of a rotary body containing a plurality of chambers, means for feeding material into one of said chambers, a piston in each chamber having its stem projecting rearwardly from the chamber and provided with a rack, pinions mounted on the body and each constantly engaging one of the racks, gearing adapted to rotate the body, a driving shaft, a clutch connected with said shaft and movable in opposite directions to, respectively, connect the shaft with said body rotating gearing and with one of the piston actuating pinions, a lever for shifting the clutch to connect the driving shaft to the body rotating gear, a spring for moving the clutch into engagement with the adjacent piston actuating pinion, means on the rotary body engaging the clutch lever to hold the clutch in an intermediate position, an adjustable abutment in the path of each piston, and a trip rod connected with each abutment, said rod being adapted to rock the clutch lever when the desired predetermined quantity of material has been introduced into the chamber being filled.

9. In a machine for dividing plastic material into portions of predetermined size or weight, the combination of a rotary body containing a plurality of chambers, means for feeding material into one of said chambers, a piston in each chamber, gearing adapted to rotate the body to bring the chambers therein successively into position to receive material from the feeding means, independent gearing adapted to move each piston to eject material from the chamber in which it is arranged, a driving shaft, a clutch member movable in one direction to connect the shaft with the body rotating gearing and in the opposite direction to connect said shaft and the means for actuating the piston of a filled chamber, a lever for shifting the clutch to connect the driving shaft to the body rotating gear, a disk on the rotary body having apertures corresponding to the number of chambers and each adapted to receive an end of the clutch lever, means controlled by the amount of rocking the clutch lever from engagement with the disk, and a spring for rocking said lever in the opposite direction into engagement with the disk and to connect the piston actuating gear of the filled chamber with the driving shaft as the end of the clutch lever comes into alinement with the next aperture in the disk.

In witness whereof I have hereunto signed my name in the presence of two subscribing witnesses.

FRIEDRICH KÜHTZ.

Witnesses:
 ERNEST ENTENMANN,
 FRIDA KLAIBER.

Copies of this patent may be obtained for five cents each, by addressing the "Commissioner of Patents, Washington, D. C."